United States Patent [19]

Cuschera

[11] Patent Number: 4,622,703
[45] Date of Patent: Nov. 18, 1986

[54] DRAIN FITTING WITH FRICTIONAL SEAL RETENTION

[76] Inventor: Casper Cuschera, 1047 - 77th Ave., Oakland, Calif. 94621

[21] Appl. No.: 765,664

[22] Filed: Aug. 15, 1985

[51] Int. Cl.[4] ............................................. F16J 15/02
[52] U.S. Cl. .......................................... 4/286; 4/292; 277/117; 277/191
[58] Field of Search ...................... 4/286, 292; 285/56, 285/57; 277/191, 192, 117, 121, 120, 124, 125

[56] References Cited

U.S. PATENT DOCUMENTS

| | | | |
|---|---|---|---|
| 1,844,409 | 10/1928 | Rypinski | 277/117 |
| 1,872,219 | 8/1932 | Baash et al. | 277/117 |
| 2,075,947 | 6/1937 | Kennedy | 277/117 |
| 3,668,718 | 6/1972 | Cuschera | 4/288 |
| 4,131,287 | 12/1978 | Gunderson et al. | 277/191 |
| 4,138,126 | 2/1979 | Jaudt | 277/191 |
| 4,329,744 | 5/1982 | Cuschera | 4/292 |
| 4,332,393 | 6/1982 | Cuschera | 4/292 |
| 4,455,693 | 6/1984 | Cuschera | 4/286 |

FOREIGN PATENT DOCUMENTS 142572 2/1902 Fed. Rep. of Germany ...... 277/177

Primary Examiner—Stephen Marcus
Assistant Examiner—Leo J. Peters
Attorney, Agent, or Firm—Harris Zimmerman; Howard Cohen

[57] ABSTRACT

A fitting for coupling a drain pipe to an opening in the base of a shower or other installation where water may accumulate includes a cylindrical body fitted into the opening in coaxial relationship with the pipe and is of greater diameter than the pipe to provide an annular gap between the body and pipe. A resilient annular seal disposed in the gap is proportioned to be radially compressed between the body and pipe and has an annular slot extending downward within the seal from the upper surface of the seal. A rigid annular compressor member is wedged into the slot to increase radial compression at the upper portion of the seal. The construction can be easily installed and removed and tolerates small variations in the vertical position of the shower base relative to the drain pipe.

8 Claims, 4 Drawing Figures

U.S. Patent  Nov. 18, 1986  4,622,703
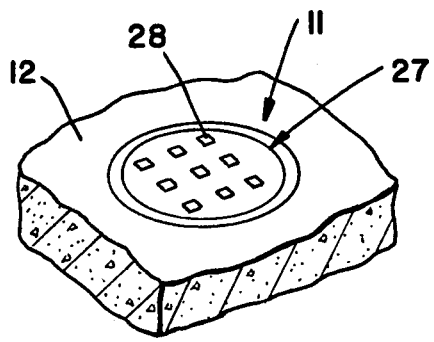
FIG_1
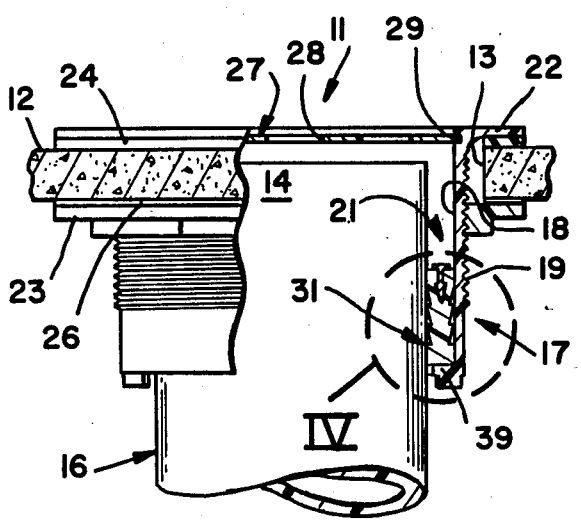
FIG_2
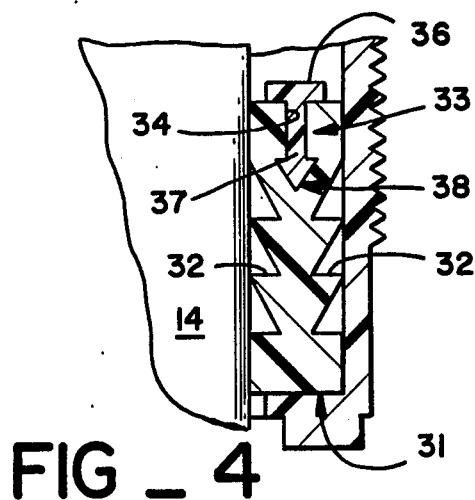
FIG_4
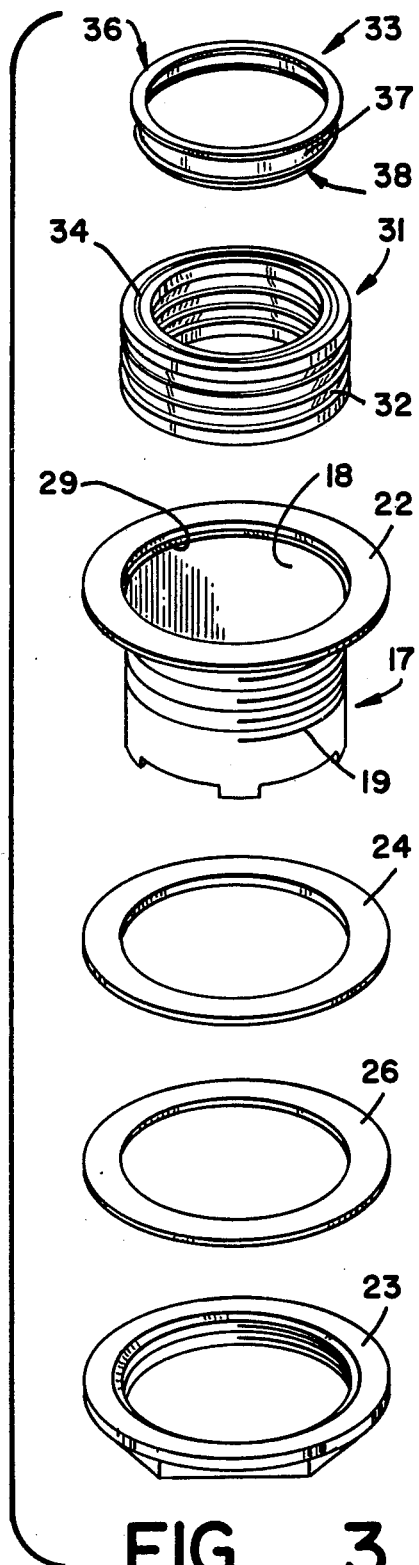
FIG_3

DRAIN FITTING WITH FRICTIONAL SEAL RETENTION

TECHNICAL FIELD

This invention relates to plumbing fixtures and more particularly to drain fittings for coupling drain openings in a floor, such as the floor of a shower cubicle for example, to a drain pipe.

BACKGROUND OF THE INVENTION

Drain openings at the base of shower cubicles or at other locations where water may accumulate generally require some form of fitting or adapter for channeling flow into a subjacent drain pipe without leakage. The constructions heretofore used for the purpose have been subject to a number of problems.

Fittings which must be soldered to a metal drain pipe are difficult to install or replace. Fittings which are permanently bonded to the drain pipe with adhesives, hardenable caulking or the like can be more easily installed but may be equally difficult to repair or replace. Fittings of either of these types can experience damaging strain from the slight structural distortions that may occur in buildings as the shower base, fitting and drain pipe are rigidly joined and relative movement is not possible.

Drain fittings which engage with threads on the drain pipe tend to be relatively complicated and costly and can also be difficult to install, particularly if such threads are not present on the drain pipe initially.

Drain fitting installation and maintenance would be facilitated if a simple, inexpensive fitting were available that could be easily installed and removed and which is tolerant of small positional displacements of a shower base or the like relative to a drain pipe. Such a fitting should not require that there be threads or other structural adaptations on the drain pipe for the purpose of engaging with the fitting.

The present invention is directed to overcoming one or more of the problems discussed above.

SUMMARY OF THE INVENTION

In one aspect of the present invention, a drain fitting for an installation having a drain opening and a drain pipe with an upper end positioned in coaxial relationship with the opening to receive drain flow includes an externally threaded annular body proportioned to be fitted into the opening in coaxial relationship with the end of the drain pipe. The body has a flange at the upper end that is of greater diameter than the opening. At least the upper portion of the body has an inside diameter greater than the outside diameter of the drain pipe to provide an annular gap between the body and the drain pipe. An apertured drain plate is carried by the body above the drain pipe. The drain fitting further includes an annular internally threaded fastener disposed coaxially on the body and engaging the external threads of the body, the fastener having a diameter greater than the diameter of the opening in order that the body may be clamped to the rim of the opening by the fastener and flange. An annular resilient seal is disposed in the gap between the body and the drain pipe and is proportioned to be radially compressed between the body and the drain pipe, the seal having an annular slot which is coaxial with the seal and which extends downward from the upper surface of the seal. A rigid annular compressor member extends into the slot in coaxial relationship with the seal and is proportioned to cause greater compression of the seal at the upper portion of the seal than is present at the lower portion.

In another aspect of the invention, a fitting for a drain opening which is situated over a drain pipe includes an externally threaded cylindrical body with an internal passage which has a diameter greater than the diameter of the drain pipe, the body having a flange at the upper end that is of greater diameter than the drain opening, an apertured plate extending across the internal passage at the upper end of the body, and an internally threaded annular fastener engaged on the body, the fastener having a diameter greater than the diameter of the drain opening. The fitting further includes an annular elastomeric seal disposed within the internal passage in coaxial relationship with the body, the seal being proportioned to be compressed between the body and the drain pipe when the fitting is installed in coaxial relationship with the drain pipe. The seal has an annular slot which is coaxial with the body and which extends downward within the seal from the upper surface of the seal. The fitting still further includes a rigid annular compressor member having an upper portion disposed over the upper surface of the seal and having a lower portion which extends down into the slot to increase the degree of compression of the seal at the upper end.

The invention provides a simple and inexpensive drain fitting which can be easily and quickly installed and removed. It is not necessary that the drain pipe be threaded or have other structural adaptations for engaging with the fitting. The invention does not rigidly bond the fitting to the drain pipe and it is not necessary to delay usage while until adhesive or caulking materials have hardened. The invention does not require a precise fixed vertical positioning of the end of the drain pipe relative to a shower base or the like and can accomodate to small vertical displacements of the shower base relative to the drain pipe if such occur.

BRIEF DESCRIPTION OF THE DRAWINGS

FIG. 1 is a perspective view of a drain fitting in accordance with a preferred embodiment of the invention as it appears when installed in the base of a shower cubicle or the like.

FIG. 2 is an elevation view of the drain fitting of FIG. 1 with portions of the fitting broken out to provide a sectional view of components of the fitting.

FIG. 3 is an exploded view of the drain fitting of the preceding figures.

FIG. 4 is an enlarged view of the portion of FIG. 2 encircled by dashed line IV thereon.

DETAILED DESCRIPTION OF THE PREFERRED EMBODIMENT

Referring initially to FIG. 1 of the drawings a drain fitting 11 in accordance with this embodiment of the invention is typically installed at a low point in the base 12 of a shower enclosure and the invention will be described with respect to that context. It should be recognized that similar fittings 11 may be used in other structures where water or other fluids might otherwise accumulate.

Referring to FIG. 2, the fitting 11 of this embodiment is disposed at a circular opening 13 in shower base 12, the opening being coaxial with the open upper end 14 of a drain pipe 16 and having a diameter somewhat larger than that of the drain pipe.

Referring now to FIGS. 2 and 3 in conjunction, fitting 11 has a cylindrical body 17 with an internal passage 18 and external threads 19. Body 17 has an inside diameter greater than the diameter of drain pipe 16 to provide an annular gap 21 between the body and the upper end 14 of the drain pipe when the fitting 11 is installed in opening 13 in coaxial relationship with the drain pipe.

A flange 22 at the upper end of body 17 has a diameter greater than that of the drain opening 13 of shower base 12 and an internally threaded annular fastener 23, engaging the threads 19 of body 17, also has a diameter greater than that of the drain opening. Thus the body 17 may be clamped to the rim of opening 13 by disposing flange 22 at the top of the shower base 12 and engaging fastener 23 on body 17, the fastener being rotated until it has traveled upward sufficiently to exert clamping pressure against the underside of the shower base. A resilient annular washer 24 is disposed between flange 22 and the shower base 12 to prevent leakage and another washer 26 is disposed between fastener 23 and the underside of the shower base 12 to prevent leakage and another washer 26 is disposed between fastener 23 and the underside of the shower base to assure that clamping pressure is evenly distributed around the rim of opening 13 and to avoid abrasion of the fastener.

A circular drain plate 27, having an array of spaced apart drain apertures 28, extends across passage 18 at the upper end of body 17. The rim of plate 27 in this example fits into a small internal slot 29 within body 17 to retain the plate in place, the plate being sufficiently thin and resilient that it may be momentarily distorted to enable engagement in the slot. Thicker and more rigid plates 27 may be secured in place with screws or other known means.

Leakage through the fitting 11 is prevented by an annular resilient seal 31, preferably formed of elastometric material, which is disposed in gap 21 between the body 17 and drain pipe 16 in coaxial relationship with the body and pipe. Referring now to FIG. 4 in conjunction with FIG. 3, seal 31 is sufficiently thick in the radial direction that it becomes slightly radially compressed as it is forced into gap 21 with minimum clearance. A series of vertically spaced annular grooves 32 in the inner and outer surfaces of the seal 31 enhance the sealing effect.

If the entire seal 31 were proportioned to require a very high degree of radial compression as it is being forced into the gap 21 between body 17 and pipe 16, installation could be difficult owing to the flexibility of the seal material. Consequently the lower portions of the seal 31 are only slightly thicker than the gap 21. A relatively high degree of compression is in fact desirable at some point along the seal 31 to assure against leakage and to assure that the seal is retained in place. This is provided for, without making installation difficult, by a rigid annular compressor member 33.

In particular, an annular slot 34 extends downward within the upper portion of seal 31 from the upper surface of the seal. Compressor member 33 has a flat annular portion 36 disposed against the top surface of the seal 31 and a lower portion 37 which extends downward into the upper portion of the seal within slot 34, the upper and lower portions 36 and 37 jointly giving the compressor member an essentially T-shaped cross sectional configuration.

Compressor member 33 tends to spread the upper portion of seal 31 but such spreading cannot actually be present when the seal is emplaced between body 17 and pipe 16. Thus emplacement results in the upper portion of the seal 31 being more strongly compressed than is the lower portion. This provides a very tight seal and strong frictional resistance to displacement at the upper portion of the seal 31. The compressor member 33 also imparts greater rigidity to the upper portion of seal 31 enabling the upper portion to be driven into place, by pressure or tapping against the upper portion 36 of the compressor member, without buckling of the seal or other difficulties.

The lower end of slot 34 within seal 31 is slightly enlarged in the radial direction and the lower end of compressor member 33 has a corresponding enlargement 38, the lower portions of the slot and compressor member in this example having a downwardly directed arrow shaped configuration when viewed in cross section. This keeps the compressor member 33 from working loose in response to pressure from the seal 31 material.

Referring again to FIG. 2, body 17 has an inwardly directed annular lip 39 at the lower end which defines the lower end of gap 21 and the lip is located to make the vertical length of the gap greater than that of the seal.

In use, the fitting 11 is easily and quickly installed by inserting body 17 into drain opening 13 and engaging fastener 23 on the body below shower base 12, washer 24 being emplaced immediately below flange 22 and washer 26 being emplaced immediately above the fastener. Rotation of fastener 23 then clamps the fitting to shower base 12. Seal 31 may then be placed into gap 21 by slight axial pressure and driven to the lower end of the gap 21. The compressor member 33 is then introduced into the gap 21, and the portion 37 thereof is driven into the annular slot 34 to seal the drain to the pipe. Drain plate 27 may then be seated in groove 29 with a snap action to complete installation of the fitting 11 which is then ready for immediate use.

Disassembly of the fitting 11 for repair or replacement is easily accomplished by disengaging fastener 23 from body 17. The body 17 may then be pried upwardly and then lifted from opening 13 which movement causes lip 39 to pull seal 31 off the drain pipe 16.

The construction does not require a precise vertical positioning of the top of drain pipe 16 relative to shower base 12 and can adapt to considerable variation in this respect. The fitting 11 can also adjust to small downward displacements of the shower base 12, relative to the drain pipe 16, such as may occur temporarily from the weight of a person using the shower or other causes. Such motion may drag seal 31 somewhat downwardly and then back up within gap 21 but this does not interfere with the sealing action.

While the invention has been described with respect to a specific embodiment, many variations are possible and it is not intended to limit the invention except as defined in the following claims.

I claim:

1. In a drain fitting for an installation having a drain opening and a drain pipe which has an upper end positioned in coaxial relationship with the opening to receive drain flow, the combination comprising:

an externally threaded annular body proportioned to be fitted into said opening in coaxial relationship with said end of said drain pipe, said body having a flange at the upper end that is of greater diameter than said opening, at least the upper portion of said body having an inside diameter which is greater than the outside diameter of said drain pipe to provide an annular gap between said body and said drain pipe, an annular internally threaded fastener disposed coaxially on said body and engaging said external threads thereof, said fastener having a diameter greater than the diameter of said opening in order that said body may be clamped to the rim of said opening by said fastener and said flange, an annular resilient seal adapted to be disposed in said gap between said body and said drain pipe, said seal having an annular slot which is coaxial with said seal and which extends downwardly from the upper end surface thereof, compressor member means adapted to extend into said slot of said seal to effect radial expansion continuously thereabout and form a leakproof seal with said pipe and said body, said compressor member means including a compressor member having a rigid annular sleeve portion dimensioned to be received in said slot in expansion fit fashion, said rigid annular sleeve portion including self-retention means to permit insertion into said slot and to prevent withdrawal from said slot, said last mentioned means including a lower portion of said sleeve having a barb-like annulus extending thereabout with a diameter greater than the upper portion of said sleeve portion.

2. The drain fitting of claim 1 wherein said compressor member has a cylindrical lower portion within said slot and a relatively broad top portion situated above said seal.

3. The drain fitting of claim 2 wherein said top portion of said compressor member has a flat upper surface.

4. The drain fitting of claim 1 wherein the lower end of said slot within said seal is enlarged in the radial direction relative to the more upward portions of said slot.

5. The drain fitting of claim 1 wherein said slot of said seal has a downwardly directed arrow shaped cross sectional configuration.

6. The drain fitting of claim 1 wherein a top portion of said compressor member situated above said slot and at least the adjacent portion of said compressor member that is within said slot jointly have a substantially T-shaped cross sectional configuration.

7. The drain fitting of claim 1 wherein the axial length of said seal is less than the axial length of said annular gap between said body and said drain pipe.

8. The drain fitting of claim 1 wherein the inner and outer surfaces of said seal each have a plurality of coaxial annular grooves.

* * * * *